April 22, 1958
J. S. POTTS
2,831,515
SLAB BARKER
Filed March 29, 1956
10 Sheets-Sheet 1
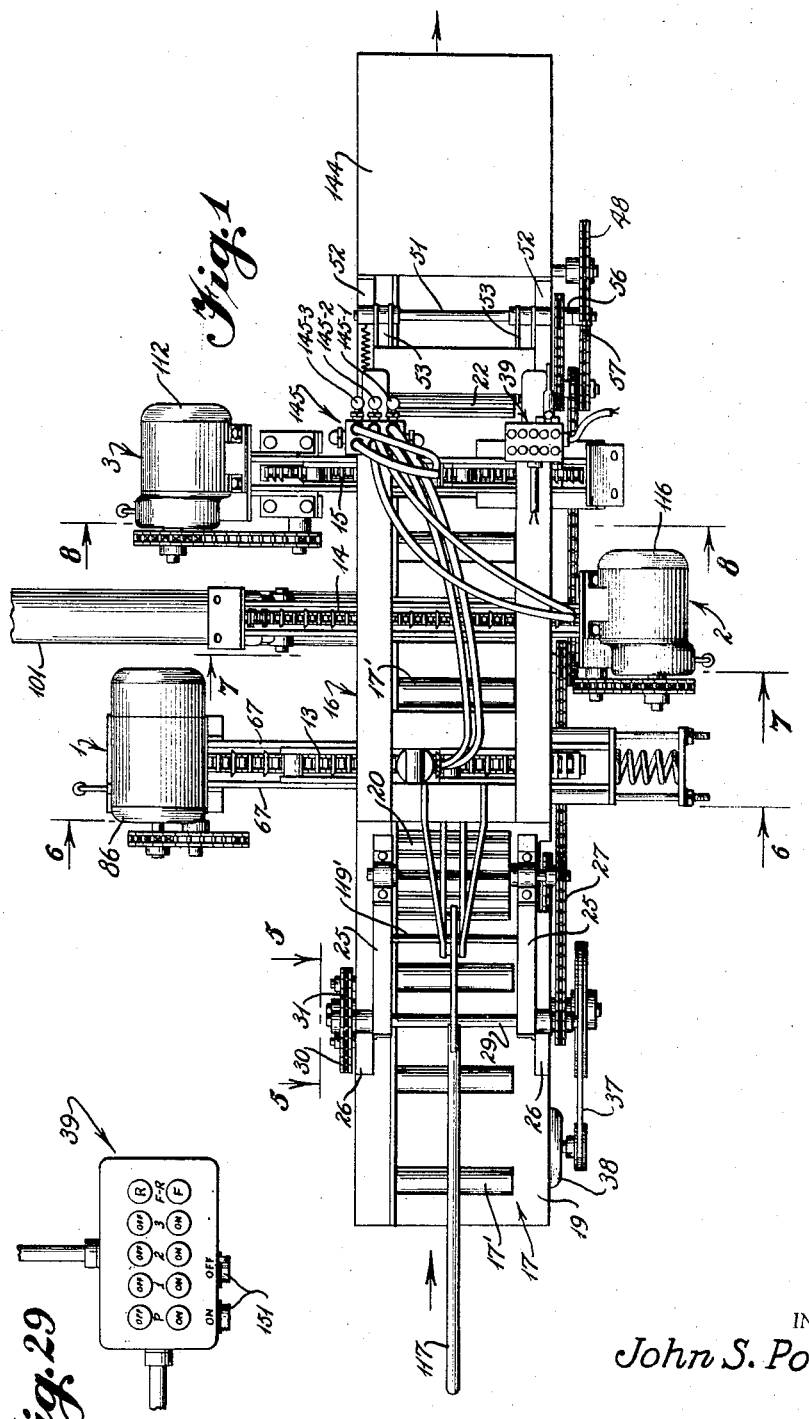
INVENTOR
John S. Potts
BY Beale and Jones
ATTORNEYS

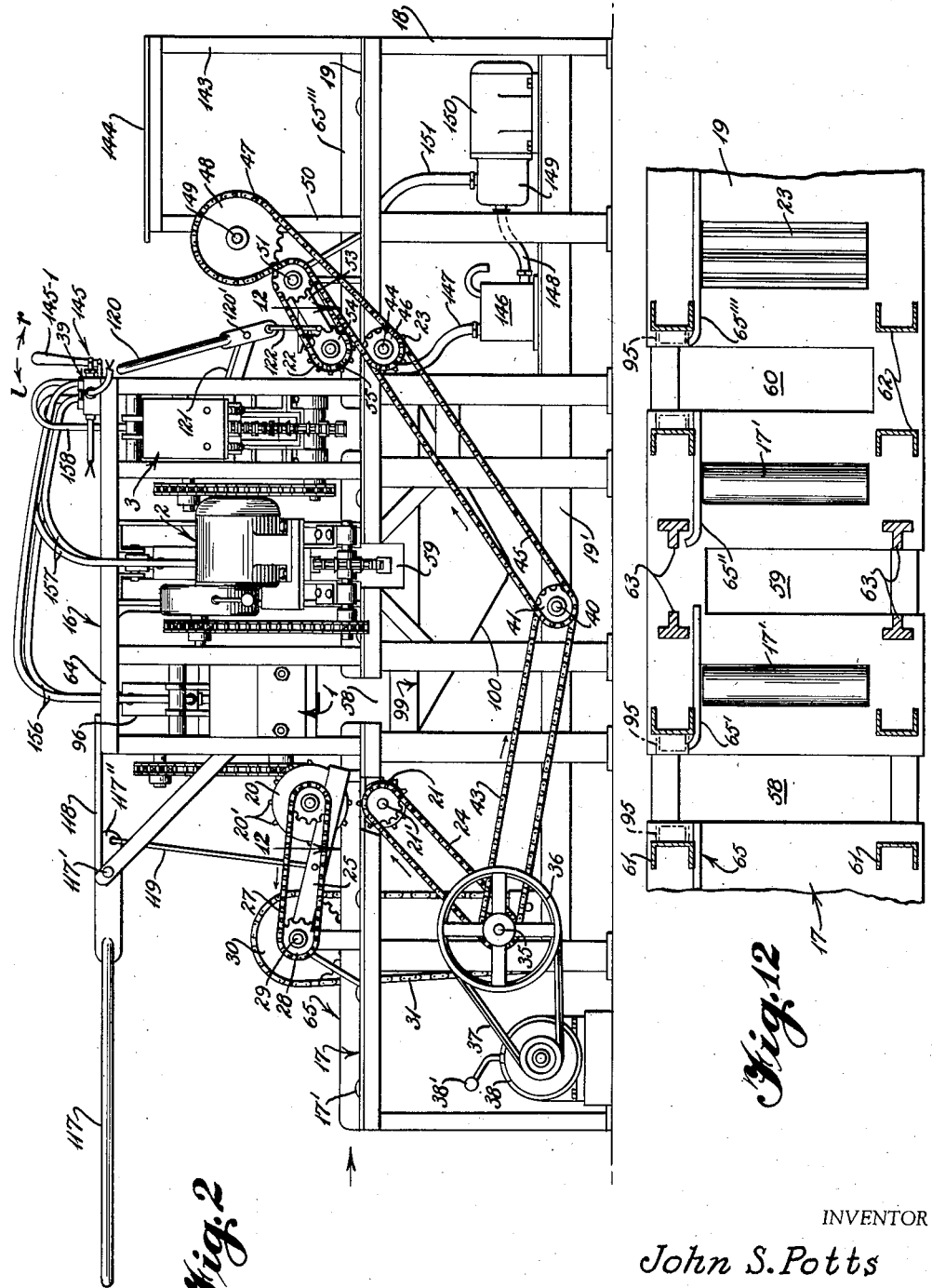

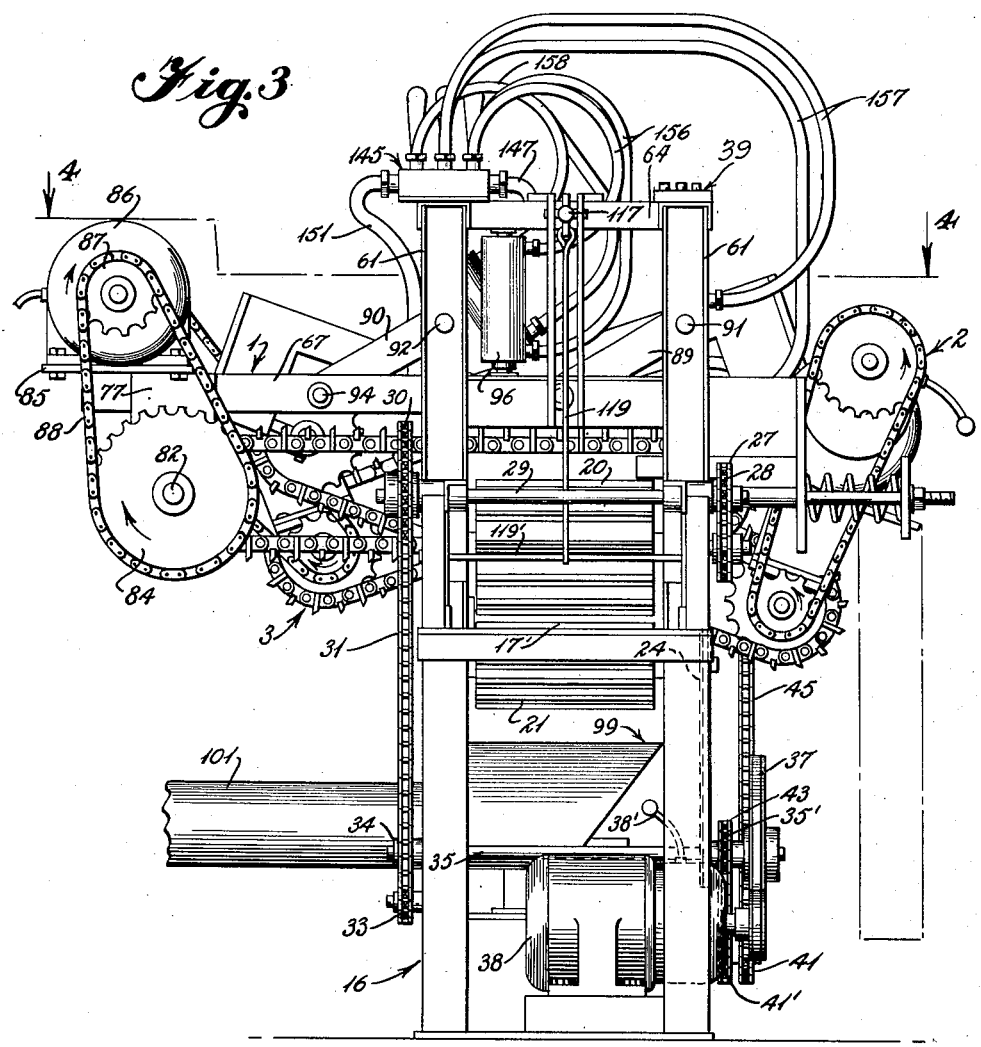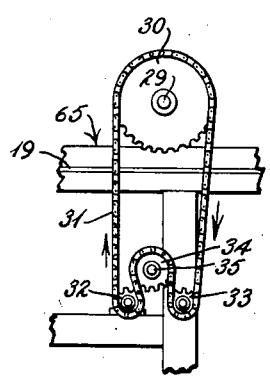
INVENTOR
John S. Potts

April 22, 1958     J. S. POTTS     2,831,515
SLAB BARKER

Filed March 29, 1956     10 Sheets-Sheet 4

INVENTOR.
John S. Potts
BY Beale and Jones
ATTORNEYS

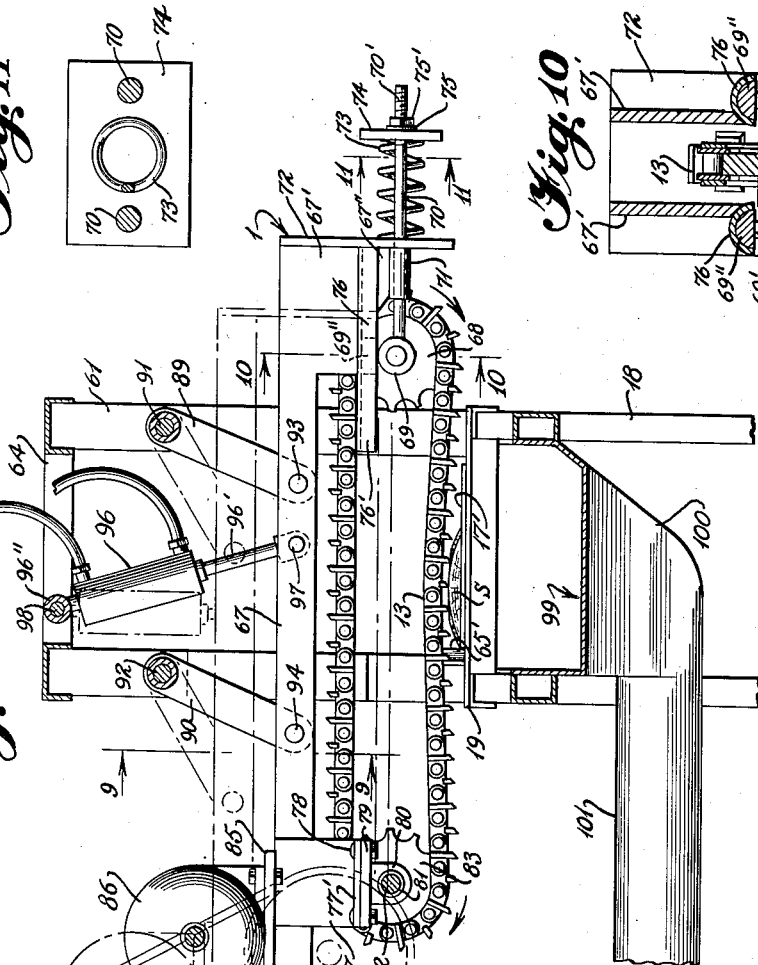

April 22, 1958

J. S. POTTS 2,831,515

SLAB BARKER

Filed March 29, 1956

INVENTOR
John S. Potts

BY Beale and Jones
ATTORNEYS

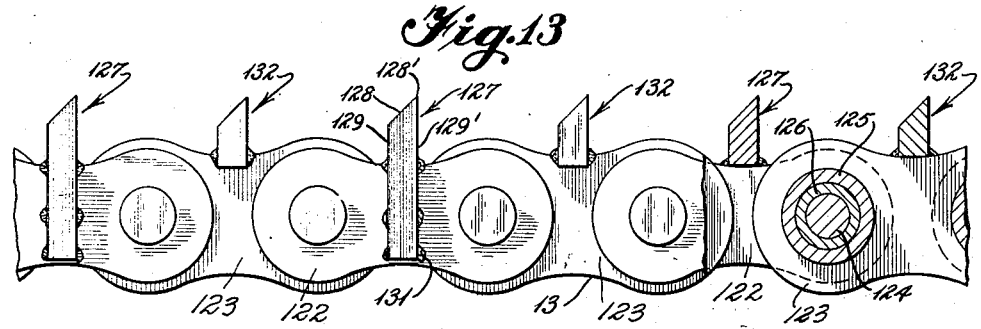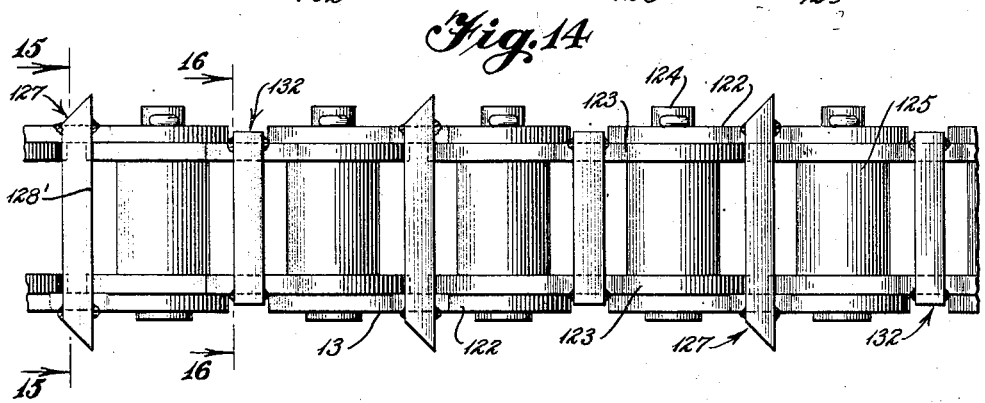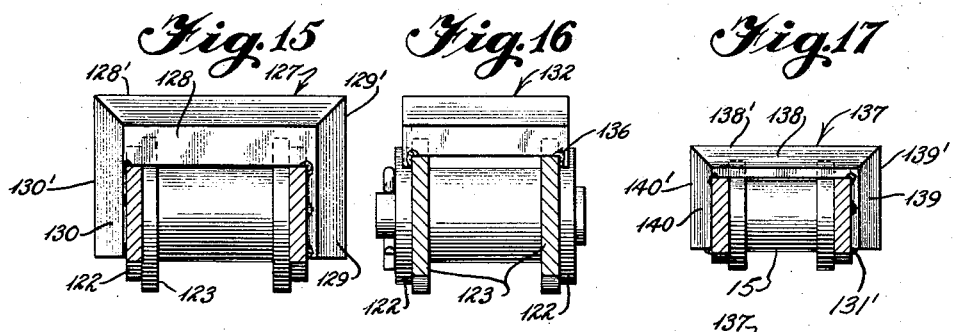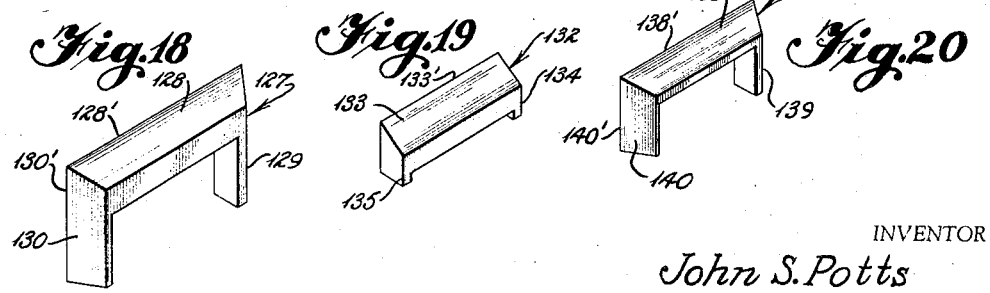

INVENTOR
John S. Potts
BY Beale and Jones
ATTORNEYS

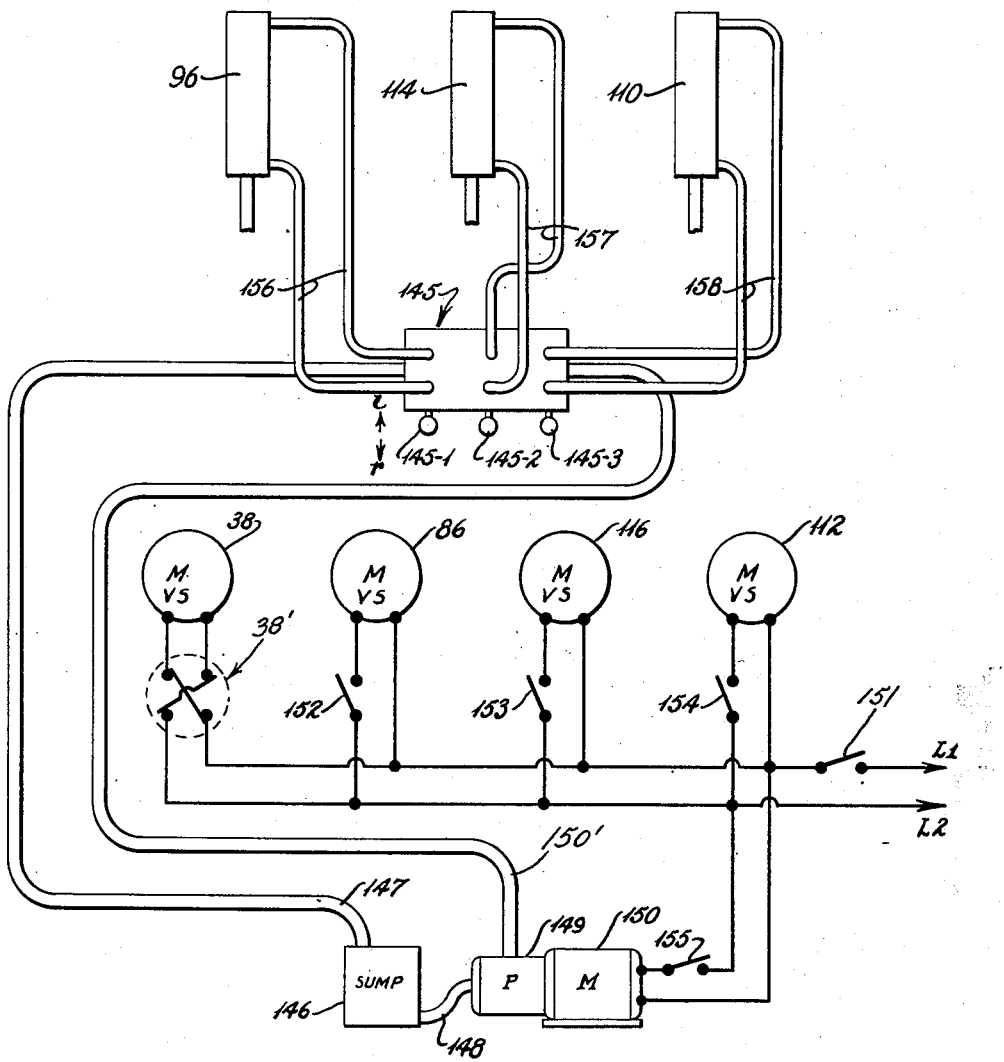

April 22, 1958   J. S. POTTS   2,831,515
SLAB BARKER
Filed March 29, 1956   10 Sheets-Sheet 10
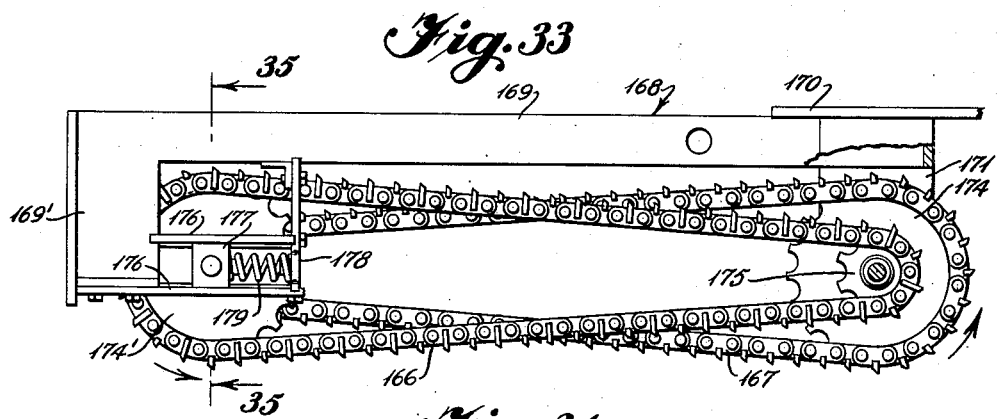
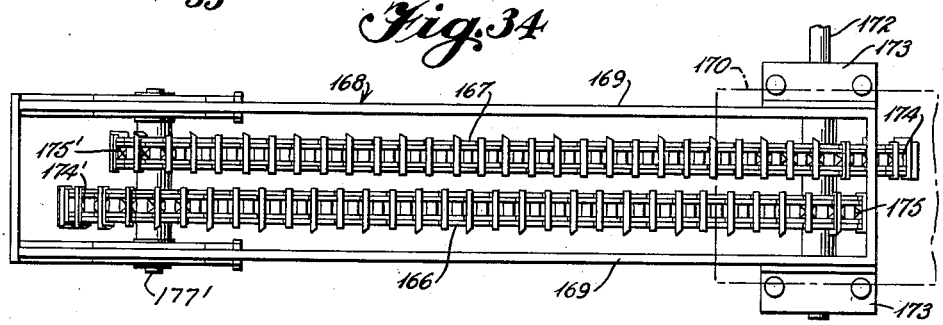
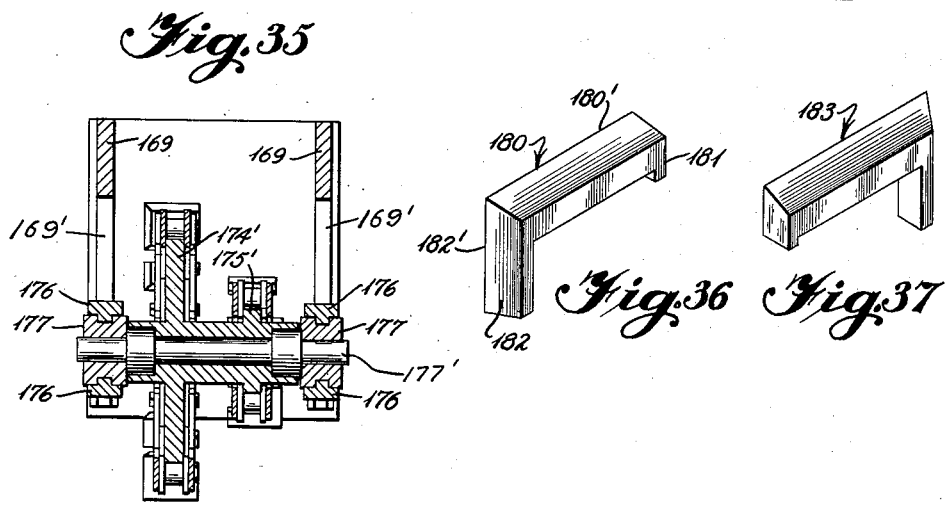
INVENTOR
John S. Potts
BY Beale and Jones
ATTORNEYS

United States Patent Office 2,831,515
Patented Apr. 22, 1958

2,831,515

SLAB BARKER

John S. Potts, Williamsburg, Va., assignor to Potts Lumber Company, Barnhamville, Va., a partnership Application March 29, 1956, Serial No. 574,863

20 Claims. (Cl. 144—208)

My invention relates to improved apparatus for removing bark from slabs.

Efforts have been made in the past to provide mechanism for removing the bark from slabs cut from logs. Mechanism of this type is disclosed in the Davidson Patent 1,759,188, issued May 20, 1930. In attempting to utilize the principles of this type of debarking machine to remove the bark from opposite arcuate side portions of the slab a single endless chain passing thereover has resulted in inability to apply pressure to the endless chain in such a manner throughout its cutting zone as to remove the bark without unduly cutting away the fibrous body of the slab. Further, a deficiency in this prior art is that when enough pressure is applied to the long endless chain to debark both sides, either the drag is so great that the feed of the slab through the machine is stopped, or the excessive pressure causes good fibrous body to be removed from the slab thus resulting in a waste of material. These above conditions are even more aggravated when there is little if any sap in the slabs.

At the present time, there is in use a certain slab-debarking mechanism utilizing chain flails which beat the bark off the slabs. This flail type of debarking machine has been found costly to maintain as the chains have to be repeatedly replaced and the operation entails removing an excess amount of good fibrous material beneath the bark since there is a lack of control of the amount of debarking.

There is a need to conserve our natural resources and at the present time there is an excessive amount of waste taking place since the slabs are left in the wood lots as there is no real economical way of removing the bark so as to provide clean fibrous material which may be, for example, run through a chipper machine and utilized as pulp stock. It is conservatively estimated that the equivalent of one acre in twenty of woodland is now being wasted through the nonutilization of slabs.

There are approximately ten thousand small sawmills in the Southern States alone producing slabs as a by-product in the sawing of lumber. These slabs for the most part are now and have been in the past burned or thrown away as they had little or no economic value due to the bark thereon. With a feasible device to debark them, they become of value such as for use as pulpwood chips. These sawmills are producing several billion board feet of lumber each year which means that with the availability of efficient and practical slab-debarker machines such as applicant's, millions of cords of pulpwood can be salvaged. Since young pulpwood averages 15 cords of pulpwood per acre, it is readily seen that many hundreds of thousands of acres of growing timber can be saved if the slabs are utilized.

It is an object of my invention to provide a barking machine for slabs that is efficient in operation and provides for adequate removal of the bark from the slabs so that they may be readily utilized for chip stock or otherwise.

Another object of my invention is to provide in a barking machine conveyor means for moving the slab through the machine against a side guide so that a first cutterhead having an endless chain with cutter elements thereon removes the upper arcuate portion of bark while progressive movement of the slab to a second cutterhead removes bark from one of the arcuate side portions of the slab and thence movement of the slab to a third cutterhead having an endless chain and cutters thereon removes the bark from the other and opposite arcuate side portion of the slab.

A still further object of my invention is to provide in a barking machine an endless cutter chain positioned above and at an acute angle to the planar face of a slab passing therethrough with its planar face down such that the cutters on the endless chain cut off the bark on a relatively short arc while torque is applied to the chain by drive means positioned immediately adjacent the lower end of the arcuate side portion being debarked.

A further object of my invention is to provide in a barking machine for slabs a first cutterhead positioned horizontally and transversely over a slab having the bark side up and passing thereunder in an axial direction so that the cutterhead and the endless chain with cutter elements thereon may be brought into contact with the upper arcuate portion of the slab by movement thereagainst, a second cutterhead arranged adjacent said first cutterhead in spaced position in the direction of movement of said slab but with the endless cutter chain of said second cutterhead directed at an acute angle to a plane containing the flat side of the slab so as to remove an arcuate side portion while the cutterhead is mounted for up-and-down movement against said arcuate side portion and a third cutterhead arranged in spaced relation to said second cutterhead in the direction of movement of said slab and at an acute angle to said plane at the opposite arcuate side portion to be debarked and for movement against and away from said last-mentioned arcuate portion with all three cutterheads under the control of an operator for movement to and from the debarking positions.

Yet a still further object of my invention is to provide in a barking machine a first cutterhead having an endless cutter chain mounted thereon with separate motor drive means therefor and said first cutterhead being mounted on pivotal links so that the head may be swung downward and inward toward the upper arcuate portion of a slab to be debarked and the chain thereon may be brought into cutting contact with said upper arcuate portion for removal of the bark therefrom; to provide further a second cutterhead in adjacent spaced relationship to the first cutterhead and in the direction of movement of said slab but mounted at an acute angle to a planar face of said slab for vertical up-and-down movement over an arcuate side portion of the slab to be debarked whereby the second head is moved directly down against said arcuate side portion therebeneath and to further provide a third cutterhead mounted at an acute angle to the planar face of said slab but in a direction opposite to said second cutterhead and in spaced relation thereto in the direction of movement of said slab through said barking machine, said third cutterhead being mounted on pivot links so that it is swingable downwardly and inwardly into contact position with the remaining arcuate side portion of the slab therebelow to be debarked.

Another object of my invention is to provide in a cutterhead for barking machines a pair of adjacently running cutter chains of the endless type with said lower run of each of said chains lying in a path which extends at an obtuse angle to the path containing the lower run of the other chain whereby the lower runs of the chains of such cutterhead span a relatively larger arcuate portion of a slab to be debarked than would a single run of a single endless chain.

Another object of my invention is to provide in an endless cutter chain cutter knives of U-shape so that the knife may be slipped over the side links of the chain and attached thereto with the legs and the bight of the knife being shaped to present cutting edges.

A still further object of my invention is to provide in cutting knives to be attached to an endless cutter chain a serrated cutting edge.

Another object of the invention is to provide in an endless cutter chain C-shaped knives that are attachable to the chain by spanning opposite side links, the longer leg and the bight portion being provided with cutting edges.

Still further objects and the entire scope of applicability of the present invention will become apparent from the detailed description given hereinafter. It should be understood, however, that the detailed description and specific examples are given by way of illustration only and, while indicating preferred embodiments of the invention, are not given by way of limitation, since various changes and modifications within the function and scope of the invention will become apparent to those skilled in the art from this detailed description.

For a more complete understanding of the nature and scope of this invention, reference may be had to the drawings in which:

Fig. 1 is a plan view of the whole machine;

Fig. 2 is a side elevation of the machine;

Fig. 3 is an end view of the machine as viewed from the left end of Fig. 1;

Fig. 5 (sheet No. 3) is an end view of the feed for the top feed roller as viewed along line 5—5 of Fig. 1;

Fig. 6 (sheet No. 5) is a vertical transverse section along line 6—6 of Fig. 1 showing cutterhead No. 1;

Fig. 9 (sheet No. 5) is an enlarged sectional view along line 9—9 of Fig. 6 showing the link suspension for cutterhead No. 1;

Fig. 10 is an enlarged section along line 10—10 of Fig. 6 showing the mounting of the idler sprocket of cutter head No. 1;

Fig. 11 is a sectional view along line 11—11 of Fig. 6 on an enlarged scale showing the compression-spring mounting for the idler sprocket of cutterhead No. 1;

Fig. 12 (sheet No. 2) is an enlarged sectional view on line 12—12 of Fig. 2 showing the cutout portions of the frame and table supported thereby forming a part of the conveyor through which the slabs are conveyed;

Fig. 13 (sheet No. 7) is an enlarged fragmentary elevation of an upper run of the endless cutter chain of cutterhead No. 1 and is broken away at the right-hand end to show one of the chain rollers and pivot pins in section;

Fig. 14 is a top plan view of the section of chain shown in Fig. 13;

Fig. 15 is a sectional view along line 15—15 of Fig. 14 showing the U-shaped cutter knife and its mounting;

Fig. 16 is a sectional view along line 16—16 of Fig. 14 showing an intermediate cutter knife spanning the inside links of a chain and its mounting;

Fig. 17 is an end view of a cutter knife similar to Fig. 15 but for a smaller sized chain of the type used on cutterheads Nos. 2 and 3;

Fig. 18 is a perspective view of the cutter knife shown in Fig. 15;

Fig. 19 is a perspective view of the cutter knife in Fig. 16;

Fig. 20 is a perspective view of the cutter knife shown in Fig. 17;

Fig. 29 (sheet No. 1) is a plan view of the electrical-control box affording the operator at his station control of the various motors powering the barking machine;

Fig. 30 (sheet No. 9) is a schematic view showing three hydraulically operated motors and a hydraulic system for moving the respective cutterheads into and out of engagement with the slab to be debarked and showing a circuit diagram for five electric motors that operate, respectively, a hydraulic-pressure pump, the slab-conveying rollers and the bark-removing chains of the three cutterheads;

Fig. 33 (sheet No. 10) is a modified form of cutterhead having a pair of endless chains with cutter elements thereof operable in paths extending at an oblique angle to each other;

Fig. 34 is a top plan view of the cutterhead shown in Fig. 33;

Fig. 35 is an enlarged sectional view along 35—35 showing the idler-sprocket mounting of the modified cutterhead;

Fig. 36 is a perspective view of a C-shaped cutter knife on the front chain of the cutterhead in Figs. 33 and 34; and Fig. 37 is a perspective view of a C-shaped cutter knife on the rear chain of the cutterhead shown in Figs. 34 and 35.

Throughout the description, like reference numerals refer to similar parts.

Figure 21:
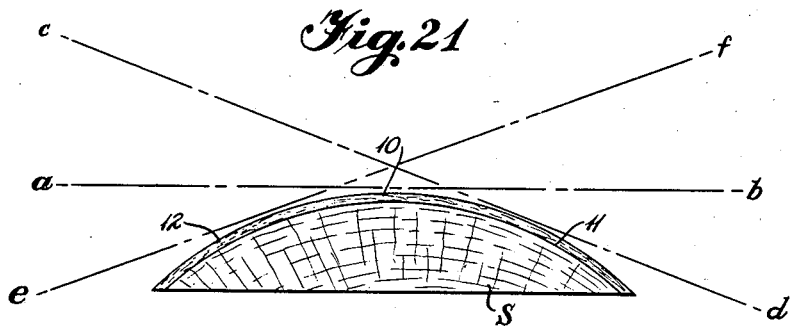
Fig. 21 (sheet No. 8) is a schematic end elevation of a slab with bark thereon, the broken tangential lines outlining the initial positions of cutterheads Nos. 1, 2, and 3, and touching the three short arcuate portions to be removed by the respective heads.

Figs. 21–28 inclusive, illustrate the problem solved by applicant's slab-debarking apparatus. In Fig. 21, a slab S is covered by bark which includes for purposes of illustration an upper arcuate portion 10 and opposite arcuate side portions 11 and 12. Line a—b illustrates the initial position fo the lower run of a chain 13 of a cutterhead 1, while tangential line c—d represents a similar position for the lower run of an endless cutter chain 14 of a cutterhead 2 and line e—f represents the tangential initial position of an endless cutter chain 15 as it is about to contact the arcuate side portion 12 of the bark to remove the same.

Figure 22:
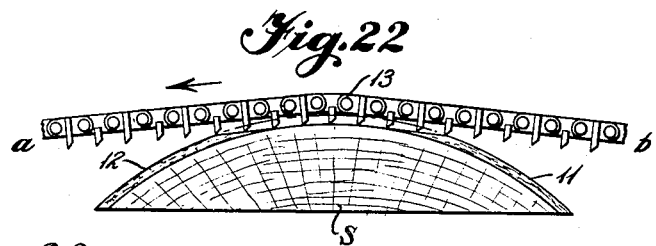
Fig. 22 is a view of the slab of Fig. 21 but shows a lower run of an endless cutter chain, represented by the line a—b in Fig. 21, after the chain has completed its upper arcuate cut of the bark.

Fig. 22 shows the cutter chain 13 of the head 1 having completed its removal of the upper arcuate bark 10.

Figure 23:
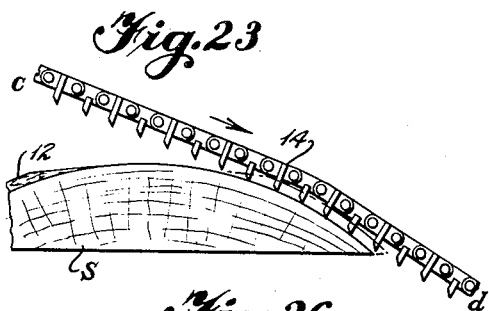
Fig. 23 is a view similar to Figs. 21 and 22 but shows the chain, of cutterhead No. 2, which is represented by the line c—d in Fig. 21, after the chain has removed the first arcuate side portion of bark.
Figure 24:
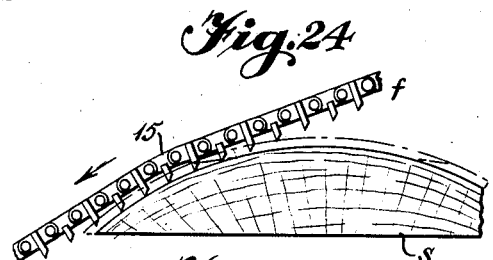
Fig. 24 is a view similar to Fig. 23 but shows the chain of cutterhead No. 3, which is represented by the line e—f in Fig. 21, after the chain has removed the second arcuate side portion of bark.

Fig. 23 shows the cutter chain 14 of the cutterhead 2 as having removed the arcuate side bark 11 while Fig. 24 shows the cutter chain 15 as having removed the arcuate side bark 12.

Figure 26:
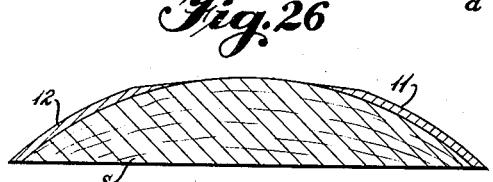
Fig. 26 is an enlarged-scale sectional view along line 26—26 of Fig. 25 showing the upper arcuate bark portion cut away.
Figure 27:
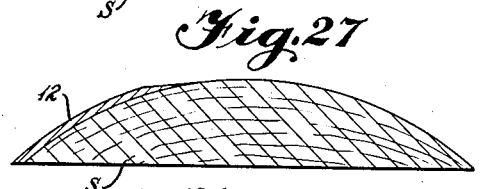
Fig. 27 is an enlarged-scale sectional view along line 27—27 of Fig. 25 showing the upper arcuate and first arcuate side portions of bark cut away.
Figure 25:
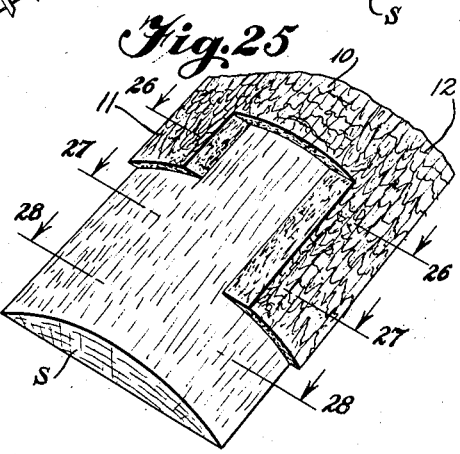
Fig. 25 is a reduced-scale perspective view showing the respective cuts of bark on a slab as made by the three cutterheads.
Figure 28:
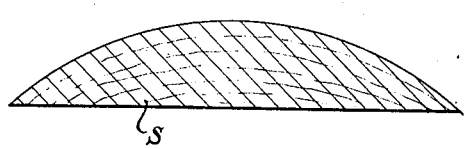
Fig. 28 is an enlarged-scale sectional view along line 28—28 of Fig. 25 showing the upper arcuate and the first and second arcuate side portions of the bark cut away thereby leaving a bark-free slab.

It will be noted that Fig. 26 represents a cross section of the slab after the upper arcuate bark portion 10 has been removed along the section line 26—26 of Fig. 25, the latter showing the slab in perspective and as having progressive cuts made thereon by the cutterhead chains 13, 14, and 15 of the respective cutterheads 1, 2, and 3. Fig. 27 is a cross-sectional view along line 27—27 of Fig. 25 after removal of the top bark portion 10 and the side bark portion 11 both of arcuate cross-sectional shape, while Fig. 28 represents the slab with all of the bark removed as shown along line 28—28 of Fig. 25 which is the state that the slab would be in after having passed the cutter chain 15. It will be observed that the bark-contacting lengths of the chains 13, 14, and 15 are relatively short, so that the respective cutterheads under the control of an operator can debark increment arcuate portions of the slab without damaging the wood portion of the slab. Contrasted to this is the use of a single endless cutter chain which in cutting off or attempting to cut off all of the bark, removes an excessive amount of fiber from the wood portion of the slab, because any run of an endless chain tends to seek a straight-line condition. In addition to this, it would be difficult to move the slab through a machine having such an expanse of endless chain in contact with all sections of bark. In the present machine, the chain 13 of the cutterhead 1 is heavier than the other two chains, since it has to initially cut into the bark as it removes the arcuate top portion 10, and since such initial cut provides a lead cut for each of the other two chains, thus permitting the use of lighter chains to remove the arcuate side portions 11 and 12.

Figure 4:
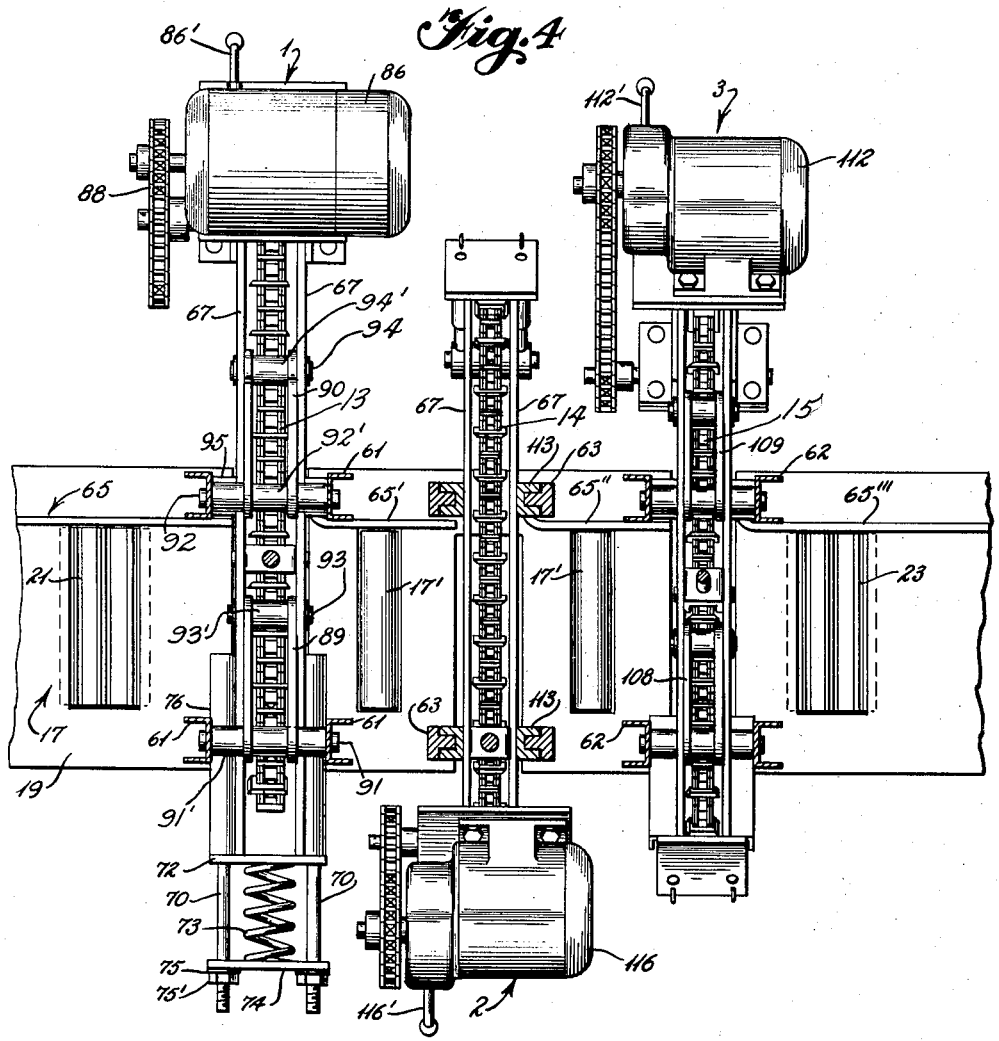
Fig. 4 is an enlarged plan view along section line 4—4 of Fig. 3 with the front and rear ends of the frame broken away.

While I have not illustrated the relative sizes of the chains 13, 14 and 15, in Figures 22, 23, and 24, such relative size is brought out in Figs. 1 and 4. Also, the cutterhead 1 is of more rugged construction than the cutterheads 2 and 3 as its chain 13 has the initial cut to make through both the side and top surface portions of the bark.

In Figs. 1, 2, and 3, a framework is generally indicated at 16 and supports a horizontally disposed conveyor mechanism generally indicated at 17 and in addition the respective cutterheads 1, 2, and 3. This frame 16 is made up of angle and channel-iron lengths and sheet stock in the apparatus illustrated. A plurality of vertical support members 18 are spaced horizontally so as to support a horizontal table 19 in which is mounted the conveyor 17. The conveyor 17 includes a plurality of idling rollers 17' on which the slabs are moved along until they reach feed rollers 20 and 21 on a feed-in end of the machine as shown in Fig. 2. Suitable control for the feed roller 20 will be described hereinafter. Take-off feed rollers 22 and 23 are positioned at the other end of the machine and serve to pull along a slab being fed through the machine by the rollers 20 and 21. Both sets of the rollers 20—21 and 22—23 are power driven. The feed rollers 21 and 23 are mounted underneath the table 19 so as to project through and above the top surface thereof so that ridges on the rollers engage the underneath side of the slab and urge it along. Power-driven mechanism including a chain 24 drives a sprocket on the end of a shaft 21' supporting the lower roller 21. The upper roller 20 is supported on a pair of pivot arms 25—25 supported at their rear ends by a cross shaft 29 supported in bearings 26 on the table 19. This top roller 20 either is solid or is hollow and loaded within with heavy weights, and is of a greater size than the lower roller 21 so as to afford plenty of traction between ribs 20' thereon and the upper surface of a slab being fed by the rollers from left to right as viewed in Fig. 2. The upper roller 20 is driven through a chain 27 connected to a sprocket 28 supported on one end of the cross shaft 29. The other end of the shaft 29 has a drive sprocket 30, as shown in Fig. 1, which is driven through a drive chain 31 best shown in Fig. 5. This chain 31 passes over idler sprockets 32 and 33 and is driven by a sprocket 34 on a cross power shaft 35 mounted underneath the table 19. The cross shaft 35 has a drive pulley 36 connected by a belt 37 to a variable-speed motor 38 which has a variable-speed-control lever 38' thereon and which is mounted on a base beneath the feed-in end of the machine. The upper slab-feeding roller 20 rotates counterclockwise as viewed in Fig. 2 while the bottom slab-feeding roller 21 rotates in a clockwise direction. Thus the slab is fed through the machine from left to right. Fig. 29 shows a control-switch box 39 for the electric motors and it will be noted that the feed rollers driven by the motor 38 may be driven in reverse or forward. To complete the drive of the take-off feed rollers 22 and 23 it will be observed that a short countershaft 40 is positioned on a bottom bed frame 19' and carries sprockets 41 and 41', see bottom of Fig. 3. The sprocket 41' is connected by a chain 43 with a sprocket 35' on the driveshaft 35, see Fig. 3. A second countershaft 44 on which is drivingly mounted the roller 23 carries suitable sprockets to receive a chain 45 from the sprocket 41 on the shaft 40 so that a drive sprocket 46 on the countershaft 44 drives a chain 47. The chain 47 spans the sprocket 46 and an idler sprocket 48 on a shaft 49 mounted on an upstanding support 50. A third countershaft 51 mounted at each end in bearings 52—52, see Fig. 1, on the frame 19 supports pivot arms 53—53 which have mounted on their outer ends the upper feed-out roller 22. A sprocket 54 on a shaft that supports roller 22 has a chain 55 passing thereover which leads to a drive sprocket 56 on the third countershaft 51, which shaft 51 also has a sprocket 57 on its extreme outer end as shown in Fig. 1, the sprocket 57 meshing one run of the endless chain 47 so as to drive the feed roller 22 in counterclockwise direction while the feed roller 23 is being driven in a clockwise direction. By this drive the control of the forward and reverse movement of the slab through the conveyor 17 is completed. While I have illustrated a typical drive means for these feed rollers, other suitable drive means may be utilized.

Referring now to the conveyor 17 in Fig. 2, it will be noted that at the feed-in end shown in Fig. 2 at the left, the arms 25 supporting the upper large feed roller 20 are controlled through a lever 117 pivoted at 117' to a support framework 118 attached to the frame 16 over and above the roller 20. Pivoted to a short lever end 117" is a depending rod 119 which is attached to a shaft 119' spanning the pivot arms 25—25 as shown in Fig. 1. Thus, the feed-in attendant of the machine can raise the heavy roller 20 if it is necessary in feeding-in a slab. For most operations the slab is pushed in from the left and is forced between the rollers 21 and 20, 20 yielding upward, and both rollers then feeding-in the slab. Roller 20, as stated above, is heavily weighted either by being solid or by being hollow and loaded with ballast and it, in cooperation with the lugs 20' thereon and similar lugs on the feed roller 21 therebelow, moves the slab through the machine until the slab is picked up by the outfeed rollers 22 and 23 which are also power-driven and which pull the slab on through the machine.

The outfeed roller 22 is controlled as respects its up-and-down movement on its pivot arms 53 by a lever 120 mounted on an angle-iron brace 121 as at 120'. A link 122 connects the lift end of the lever 120 to the lever arms 53.

Cutterheads

In order to carry out the various small arcuate cuts to remove the bark as explained for Figures 21 thru 28 inclusive, there are provided three independently operated cutterheads having endless chains thereon which are provided with cutter elements. Fig. 12 shows the table or bedplate 19 provided with cutout areas 58, 59 and 60; for the first, second and third cutters, respectively. These cutters are mounted for up-and-down movement as will hereinafter be described so that they may be brought into contact with the respective arcuate portions of the slab which they are to debark.

Mounted on the upper face of the bedplate 19 and suitably braced are four upstanding channel members 61, one at each corner of the cutout area 58, the webs of the four channel members extending crosswise of the bedplate 19, and the webs of the two channel members 61 at each of the forward and rear sides of the cutout area 58 being coplanar and the webs of the channel members 61 at each side of the bedplate 19 being disposed in confronting relationship. At the cutout area 60, four upstanding channel members 62 are similarly mounted back to back at each side so as to provide supports and guides for the cutterhead 3 as will hereinafter be described. Four upstanding T bars 63, one at each corner of the cutout area 59, support the cutterhead 2, the two T bars 63 at each side of the bedplate 19 having the legs thereof extending toward each other as best shown in Fig. 12. Still having reference to Fig. 12 it will be noted that the idle and lower feed rollers 17, 21 (see Fig. 2) and 23 are positioned in the table 19 so that only the upper portions of their peripheries project through the upper surface of the table. In Fig. 2 it will be noted that the sets of channel members 61 and 62 and the T bars 63 are tied together by a suitable horizontally disposed top framework 64 of channel iron. The whole frame is made up by welding the various support members and plate members. In Fig. 12 it will be noted that there is secured adjacent one side of the frame and over the platform 19 a side guide generally indicated at 65 for the slab and having a section 65' intermediate the cutout areas 58 and 59 with the forward end thereof bent outward so as to form a smooth guide for the slab edge to be positioned therealong. Between the cutout areas 59 and 60 for the cutterheads 2 and 3 respectively, another section 65" of the guide is shown while the third section at the rear of cutout area 60 is indicated at 65'". The slab rides with its edge alongside this guide 65 and the cutterheads 1 and 3 have their endless chains driven in such directions that their lower reaches move across the table and toward the guides 65 and have a tendency to press the traveling slab against the guide 65 and the table 19.

As best shown in Fig. 6, the cutterhead 1 is mounted for swinging movement against and away from the top arcuate portion 10 of slab S to be debarked, the retracted position being shown in broken lines. The cutterhead 1 is made up of two longitudinal side plates 67—67 horizontally spaced and each having stepped, depending flange portions 67' and 67" at the right-hand or idler-sprocket end. An idler sprocket 68 is supported by end bearing blocks 69—69, each of which has a support rod 70 welded thereto and extending radially therefrom and parallel to the side plates 67. The rods 70 are supported by extending them through elongated cylindrical sleeves 71 which are welded to the depending flange portions 67", and through a depending transverse end plate 72 which serves as one abutment for a spring 73 that is compressed between the plate 72 and a securing plate 74. The rods 70 extend through the plate 74 and are threaded at their outer ends 70' to receive washers 75 and nuts 75'. Thus, the idle sprocket 68 is mounted for sliding movement by rods 70 and is biased by the compression spring 73 so as to hold the cutter chain 13 taut, and yet there is give in the cutter chain 13 to accommodate the slight curvature in the short span of the top arcuate bark portion. In view of the fact that there are compression and tension forces taking place in chain 13 during its cutting operation, it is imperative that the idle sprocket 68, its shaft 68' and the end bearings 69—69 be firmly mounted. To assist in this mounting the bearing blocks 69 are formed with upstanding stems 69' which are integrally connected with bearing pieces 69" of semicircular cross-sectional shape but having an elongated connection as shown in Fig. 6 in broken line. These guides 69" ride in semi-circular shoes 76 which are welded to lower edges of the depending flange 67' and extend beyond flange 67' as indicated at 76' so as to provide a full track to guide the bearing blocks 69 supporting the idler pulley 68. The extension 76' of the shoes 76 serves as a guide between the adjacent longitudinally spaced vertical channel supports 61—61 as best shown in Fig. 4. The other end 67'" of the side bars 67—67 supports a motor 86 and drive sprocket 83 as shown in Fig. 6. To the outer sides of the side bars 67 and in spaced relation to the ends 67'" thereof is attached as by welding depending angle members 77 having outwardly extending flanges 77' to each of which is bolted as by bolts 78 a bearing bracket 79 having a depending lug 80 which is apertured and houses a bearing 81 supporting the end of a drive shaft 82.

Mounted on the shaft 82 is the drive sprocket 83 about which the chain 13 is trained and driven. Fig. 3 shows a large driven sprocket 84 on the shaft 82. The motor 86 is combined with a variable speed transmission operated by a handle 86', is mounted on a plate 85 and has a drive sprocket 87 which is connected through a chain 88 to the sprocket 84. The cutterhead 1 as shown in Fig. 6 is mounted for swinging movement by means of two pairs of side links 89 and 90 pivotally connected to the supports 61 by transverse pivot shafts 91 and 92 respectively, while their lower ends are pivoted to the side plates 67 by means of pivot pins 93 and 94 respectively. The bars 67—67 are mounted so as to have a horizontal attitude in all positions of their swing. Fig. 4 shows suitable spacer collars 91', 92', 93', and 94' holding the links in proper position on the respective pivot shafts 91, 92, 93, and 94. Referring to Fig. 9 it will be noted that a channel 95 is attached to each web of the two support members 61 adjacent the links 90 and that these channels 95 serve to guide the cutterhead in its swinging movement. This same type of guide and spacer is provided for the cutterhead 3 adjacent the opening 60 in the bedplate 19 as shown in phantom outline in Fig. 12. In order to swing the cutterhead 1 on the links 89 and 90 a power piston 96' and cylinder 96 which may be pneumatically or hydraulically operated but as here shown are hydraulically operated, has the lower end of the piston rod 96' pivotally connected intermediate the links 89 and 90 to the side bars 67 by means of a pivot pin 97 and has the upper end of the cylinder 96 pivotally attached as at 96" to the top framework 64 by means of a pivot pin 98. Fig. 6 shows the elevated position of the cutterhead in broken lines and shows its full cutting position in solid lines, the latter position being reached after removal of the top arcuate portion of bark S. This cutterhead 1 is easily lowered into contact with the slab by operating the piston rod 96'. It will be noted in Fig. 6 that the direction of movement of the lower run of the chain 13 moves the cutter knives thereon against the top arcuate portion of the bark urges the slab S toward the elongated side guide member 65'. The lower run of the cutter chain 15 on the cutterhead 3 acts in the same manner. Since the axes of the four pivots 91, 92, 93, and 94 form a parallelogram, the cutterhead 1 remains horizontal when moving from one level to another. As best shown in Figs. 2, 5, 6 and 7, an elongated hopper 99 is mounted between the support legs 18 and underneath the three cutterheads so as to collect the bark removed from the slab. This hopper 99 has a lower throat portion 100 and a suction conduit 101 which is connected to a suitable suction fan to remove the bark from beneath the respective cutterheads.

Figure 8:
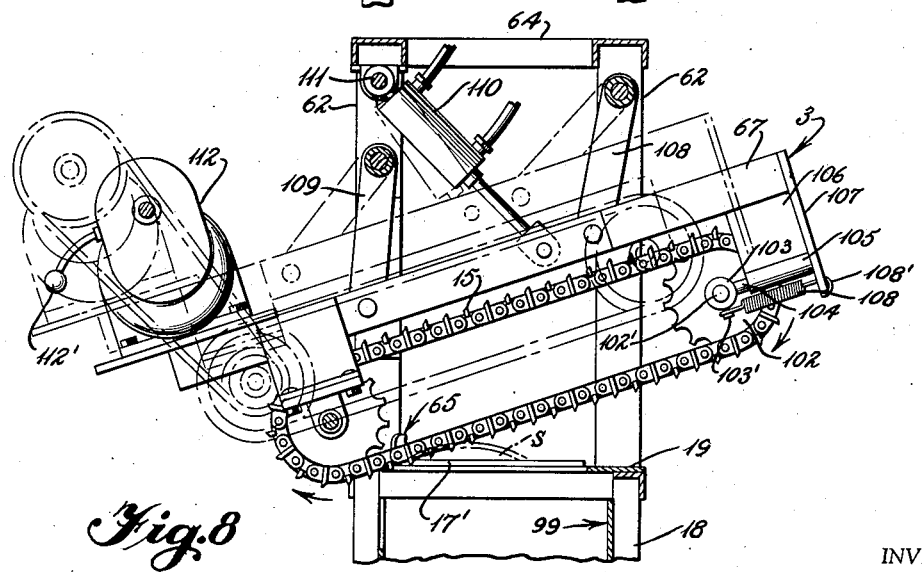
Fig. 8 is a vertical transverse section along line 8—8 of Fig. 1 showing cutterhead No. 3.

Reference is now made to Fig. 8 and the construction of the cutterhead 3 and its mounting. Cutterhead 3 is similar in construction to the cutterhead 1 except that the cutter chain 15 is of smaller size and an idler sprocket 102 is supported a little differently. The sprocket 102 has its shaft 102' mounted in bearings 103 at each end, the bearings being attached to shafts 104 that are reciprocally mounted in sleeves 105 welded to flange plates 106 depending from the horizontally spaced side bars 67. Attached transversely to the ends of the bars 67 and the depending flange plates 106 is an end plate 107. Holding the chain 15 in a taut condition are two tension springs 108 each secured at 108' to the lower end of the plate 107 and at the other end to a lug 103' depending from the bearing member 103 on each side of the sprocket 102. Thus the chain 15 is held taut and is yieldable to a limited extent in its cutting of the relatively short arcuate side portion of slab S. As in the operation of the cutter chain on cutterhead 1, should the chain encounter a knot or a rough place or unusually tough section of the bark, the operator can control its up-and-down movement as well as setting the amount of pressure thereon. At the same time the chain will yield through the mounting of the idler sprocket 102 and the tension springs 108 to a limited extent. Contrasted with the horizontal mounting of the cutterhead 1 which removes the top arcuate portion 10 of the bark, the cutterhead 3 is mounted at an angle of about 20° to the horizontal such that it will remove the short arcuate side portion of bark 12 as shown in Fig. 24 of the illustrations. To accomplish this mounting, pivot links 108 and 109 are mounted at their upper ends on pins extending between the side pairs of the channels 62 in vertically spaced relation so that an approximate 20° angle is formed with the horizontal by the cutterhead 3. A combined piston-and-cylinder operator 110 is pivotally mounted at its lower end on a pin extending between the side bars 67 of the cutterhead 3 and at its upper end on a pin 111 extending between the vertical legs 62 above the link 109. A combined electric-motor and speed-gear drive is indicated at 112 and it has a speed-control lever 112'. The motor 112 is of smaller capacity than the motor 86 on the cutterhead 1. It will be observed in Fig. 8 that the cutterhead 3 can be swung outward and upward out of contact with slab S to the broken-line position and downward and inward into contact with the arcuate side portion of the slab.

The operator has under his control the movement of this cutterhead 3 and the force with which it may be brought into contact with the arcuate side portion 12 to be removed from the slab. Since the top cut has already been made by the cutterhead 1 which is of relatively heavier construction so as to make the initial cut, the work for the other two cutterheads 2 and 3 is decreased and thus the size of the cutter chains 14 and 15, and the power required to operate them is necessarily less.

The cutterhead 2 is of like construction to the cutterhead 3. However, the chain 14 of the cutterhead 2 is driven in the opposite direction from that of the chains 13 and 15 of the cutterheads 1 and 3 as shown by the arrows in Figs. 6, 7 and 8, the chains 13 and 15 moving so as to urge the slab against the longitudinal edge guide 65. The cutterhead 2 is mounted for vertical up-and-down movement in the illustrated apparatus and is positioned at about a 20° angle to the bedplate 19 so as to remove the short arcuate side portion 11 of the bark as shown in Figs. 21–26 inclusive.

In mounting the cutterhead 2 for vertical up-and-down movement use is made of the pair of T-shaped columns 63 at each side of the framework. As shown in Fig. 4, each of the side bars 67—67 of the cutterhead 2 has welded thereto a pair of U-shaped elongated shoes 113 which are received by the legs of the support members 63 and serve as very stable vertical guides for the cutterhead 2 as the latter is moved vertically up and down by the cylinder-and-piston unit 114 that is pivotally attached as at 115 to the vertical support legs 63 adjacent the motor end of the cutterhead 2. It will be noted that the combined motor and variable-speed drive 116 for the cutterhead 2 has a speed-change lever 116' as shown in Fig. 4 and that both are of like construction to the corresponding parts shown in Fig. 8 for the cutterhead 3. The motor 116 is mounted on the lower side of the inclined cutterhead 2 and a drive sprocket 116" for the chain 14 is mounted below the motor. This cutterhead 2 requires only short vertical travel as it is mounted directly above the arcuate side portion 11 of the slab. As in the case of the cylinders 96 and 110, the operator has full control of the power cylinder 114 so as to move the cutterhead 2 up and down and to control the force with which the cutter chain 14 is brought into contact with the arcuate side portion 11 of the bark.

In each of the cutterheads, the run of the endless cutter chain is relatively short and the power sprocket which pulls the lower run of chain over the arcuate bark portion is positioned in relatively close spaced relation to that bark portion so that the full amount of force is applied to pull the chain across the bark section rather than to push the chain. This has the effect of keeping the chain relatively straight but allowing for slight arcuate yield to conform to the arcuate cross section of the slab. Such action permits a clean removal of bark and a minimum removal of good fiber from the slab, the latter involving an important conservation matter. At the same time by providing three cutterheads, each cutting a relatively short arc, there is no trouble in feeding the slab through the machine since the sum of the pressures exerted by the heads is less than the pressure that would be exerted by a single chain that would remove all of the bark. Also the pressure on each head is individually controlled by an operator at a central station in order to permit simultaneous operation of the cutterheads under individual pressures corresponding to varying conditions of the bark as such bark moves under the respective cutterheads. The flexibility of control of these cutterheads in their up-and-down and in-and-out movements and the amount of pressure that can be brought to bear against the bark lends itself admirably to expeditiously removing the bark without digging into the fibrous portion of a slab that is being salvaged. Thus, economic salvage of slabs is obtained as contrasted with the excessive waste that has been taking place. The cutterheads remove the bark in a clean manner leaving much less than 2% of the total bark on the slab as contrasted with up to 10% that is permissible for chip-stock material. The reason for not achieving complete bark removal is that the slabs are not all of uniform cross section, and that some have knots and uneven portions adjacent which some of the bark may not be removed.

*Cutter knives*

Figures 31, 32:
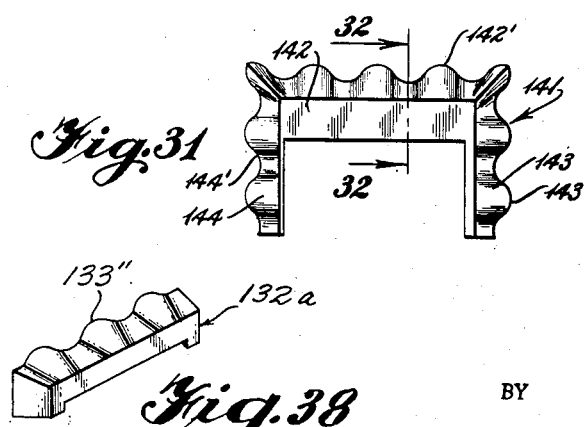
Fig. 31 (sheet No. 4) is a modified form of large cutter knife.
Fig. 32 is an enlarged sectional view along line 32—32 of Fig. 31 showing the cutting edge of the modified knife.
Figure 38:
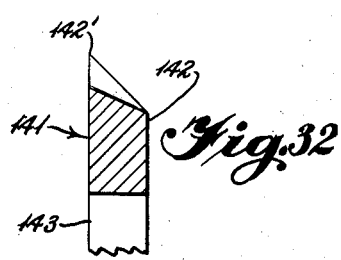
Fig. 38 (sheet No. 4) is a perspective view of a modification of the short cutter bar or knife shown in Fig. 19.
Figure 7:
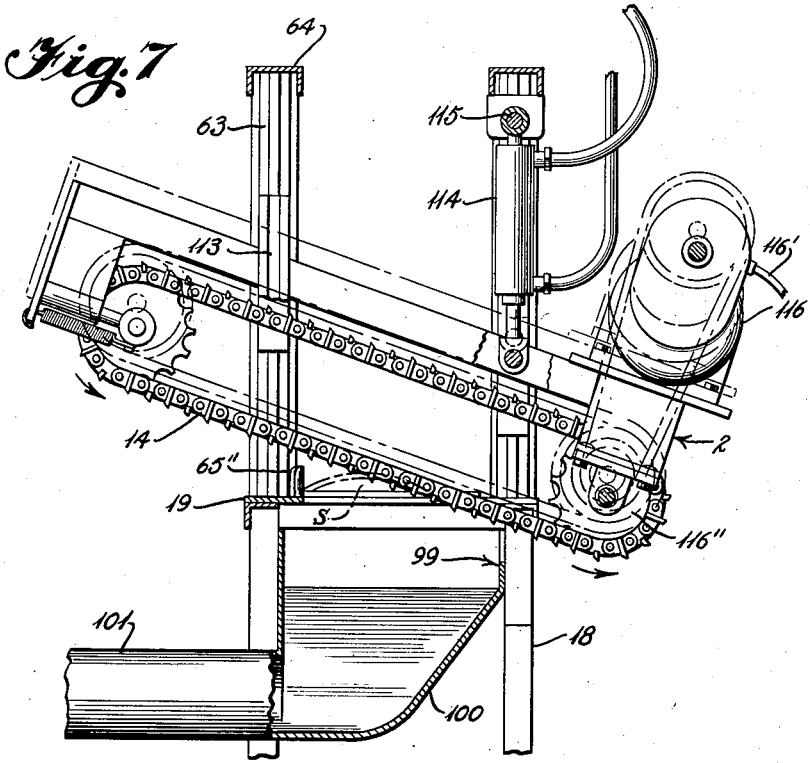
Fig. 7 is a vertical transverse section along line 7—7 of Fig. 1 showing cutterhead No. 2.

Reference is now made to Figs. 15–20 showing the respective cutter knives utilized on the disclosed apparatus. Figs. 31, 32 and 38 show modified forms of cutting edge of a fluted or serrated type.

The cutter chain 13 as illustrated in Figs. 13 and 14 is considered typical. It is of the usual roller-chain type having side links 122—122 and inside links 123—123, each of said links having a concave edge portion intermediate its ends. The links are secured in overlapping relation by pins 124 which carry rollers 125 and inner sleeves 126. A main cutter tooth or knife is indicated at 127 and is of generally U-shaped construction having a bright portion 128, a front side leg 129, and a rear side leg 130. The bight portion 128 is sharpened as are the leg sides on about a 45° angle so as to form the respective cutting edge 128', 129', and 130'. The forward cutting leg 129 is a small amount wider than the rear cutting leg since it does the major cutting work and the rear cutting leg 130 is only used when backing up the slab to remove bark that has been missed.

The upper bight portion 128 is relatively thick and provides as do the legs 129 and 130 a relatively thick backing that permits regrinding and thus a tooth may be utilized for a long period of time. The width between the legs 129 and 130 of the cutter 127 is such as to clear the span between the outer links 122 and the legs are attached to these links by welding as indicated at 131. As shown in Fig. 14, the cutting edges 128', 129', and 130' are the leading edges of the tooth 127 as the chain 13 moves across a slab. Fig. 16 shows a short cutter bar or knife 132 which is also shown in perspective in Fig. 19 and on chain 13 in Figs. 13 and 14. This is of smaller U-shaped construction and has a bight portion 133, a cutting edge 133' thereon, and short legs 134 and 135 which do not have cutting edges thereon. The span of the cutter knife 132 between the legs 134 and 135 is sufficient to fit over the inside links 123 as best shown in Fig. 16. This short cutter knife 132 is secured to the recessed side portion of these links by welding as indicated at 136.

For the smaller chain 15 (see Fig. 17) of the cutterhead 3, a cutter knife 137 of the same type as the large cutter knife 127 shown in Fig. 15 is utilized but is of smaller size. This small cutter 137 has a bight portion 138 with a cutting edge 138' formed thereon, a front leg 139 with a cutting edge 139 thereon, and a rear cutting leg 140 with a rear cutting edge 140' thereon. This is secured to the outer links by welding as indicated at 131'. As in the main cutting knife 127 the cutting edges 138', 139' and 140' are formed by an approximately 45° bevel, the front leg 139 is made wider than the rear leg 140, and the bight portion 138 and the leg portions 139 and 140 are provided with a relatively large amount of body so that the knife may be resharpened for long wear and efficient cutting. Since the other smaller chain 14 travels in a direction opposite to that of the chains 13 and 15, its cutter knives (not illustrated) would correspond to the knife 137 shown in Fig. 17, except that the relative positions of the legs 139 and 140 would be reversed, in order to locate the wider leg on the front side of the chain 14.

Figs. 31, 32 and 38 show modified forms of cutting edges, Figs. 31 and 32 showing a main cutting knife 141 having a bight portion 142 with a fluted or serrated top cutting edge 142', a front cutting leg 143 with a fluted cutting edge 143' and a rear leg 144 with a fluted edge 144'. It will be noted that the knife is also sharpened on an approximate 45° angle as indicated in the cross section in Fig. 32. Fig. 38 shows a modified short cutter bar or knife 132a having a serrated cutting edge 133''. These modified versions of cutting knife would tend to have less drag than the straight-edged cutting knives 127, 132 and 137 shown in Figs. 15, 16 and 17, respectively.

Controls

Figs. 1 and 2 show a seat 144 mounted over the table 19 at the takeoff end by the upstanding support members 50 and by other uprights 143, so that an operator may face toward the feed-in end, namely, the left-hand end of Fig. 2, and view the action by the respective cutterheads 1, 2, and 3 as the slab is fed thereunder from left to right. He can view the top and side portions 10, 11 and 12 and can thereby control the respective cutterheads in their cutting action. This is carried out by means of the hydraulic control unit generally indicated at 145 and having a control 145–1 for the cutterhead 1, 145–2 for the cutterhead 2, and 145–3 for the cutterhead 3. Fig. 2 shows the control as a lever 145–1 which may be moved according to the arrows to lower or raise as indicated at *l* and *r*. In the apparatus shown a hydraulic system is used and includes a sump tank 146 which is mounted on the lower bed frame 19' and has a return drain line 147 and a line 148 leading to the suction side of a pump 149 driven by a motor 150 which is also mounted on the bottom bed frame 19'. An output line 150' sends hydraulic fluid under pressure through the control unit 145 and thence through three pairs of alternately pressure-and-discharge lines 156, 157 and 158 to the respective ends of the power cylinders 96, 114, and 110 for the cutterheads 1, 2, and 3. Also at the operator's control station, is the electrical control box generally indicated at 39 in Fig. 29 and also shown in Fig. 1. This box 39 contains switches that control the motor 38 that drives the slab-feeding rollers 20, 21, 22, and 23 and the motors 86, 116 and 112 that drive the cutterhead chains 13, 14 and 15, respectively. There are "on" and "off" buttons 151, see Fig. 29, to operate a corresponding switch 151 schematically shown in Fig. 30 in the power line L1. Three sets of "off" and "on" buttons labeled 1, 2 and 3 in Fig. 29 control switches 152, 153 and 154, respectively, connected in one of the power lines to the motors 86, 116 and 112. A switch 155 is schematically shown in Fig. 30 and is operated by buttons labeled P in Fig. 29 to control the pump 150. A reversing switch generally indicated at 38' in the schematic diagram controls the direction of rotation of the variable-speed slab-feeding motor 38.

Modified cutter head and knives

Figs. 33 to 37 show a modified cutterhead and modified forms of knives used thereon. In order to accomplish in a more advantageous manner the removal of bark from an arcuate surface such as on a slab, I have provided a pair of adjacently positioned cutter chains 166 and 167 in my modified cutterhead generally indicated at 168. A pair of horizontally spaced side bars 169 similar to the side bars 67 in my previously described construction are used to mount a platform 170 for a chain-driving motor and to provide depending flanges 171 which carry angle bars 173 that support bearings for a power shaft 172. On this power shaft 172 is a double-sprocket wheel having a large drive sprocket 174 and a small drive sprocket 175, these sprockets corresponding respectively to opposite-sized sprockets 175' and 174' of a double-sprocket wheel provided at the idler end. Thus the reaches of the chain 166 and 167 cross at their middle at an oblique angle as viewed in Fig. 33 and thus they would accommodate to greater advantage an arcuate portion of the bark on a section of slab. The idler end of each of the side bars 169 is provided with a depending flange 169' and with a hanger bracket 178 spaced inwardly from the flange 169'. Connecting the flanges 169' and the hanger brackets 178 are trackways 176 that slidably mount bearing blocks 177. A compression spring 179 is mounted between the hanger bracket 178 and the bearing block 177 on each side; and thus the idler double-sprocket wheel, which is carried by an idler shaft 177' that turns in the bearing blocks 177, is biased to the left as viewed in Figs. 33 and 34 to hold the endless cutter chains 166 and 167 taut, yet allowing a certain amount of yield when the chains strike knots and uneven surfaces in the slab being debarked. As in the cutterheads 1, 2 and 3, provision is made upon reverse movement of the slab through the machine to cut any skipped bark. To accomplish this the cutter chains 166 and 167 are provided with modified cutting teeth 180 and 183, respectively, having a depending leg on only one side, that is, the front side for say chain 166 and the rear side for chain 167. In Fig. 36 I have shown the cutter tooth 180 as somewhat C-shaped but having a short depending leg 181 and a long depending leg 182 the latter having a cutting edge 182'. The tooth 180 has a main cutting edge 180' corresponding to the cutting edge 128' of the cutter tooth 127 previously described. These cutter teeth 180 are welded to the outer side links of the chain 166 in the same manner that the teeth 127 and 137 are welded to their chains 13 and 15; and in a similar manner, the inside links of the chain 167 are provided with bars corresponding to the bars 132 of the chains 13 and 15. The cutter tooth 183 for the rear chain 167 is constructed like the tooth 180 except that the positions of its long and short legs are interchanged in order that the longer leg will be disposed on the rear side of the rear chain 167.

I claim as my invention:

1. A barking machine for removing bark from slabs, each having an upper arcuate portion of bark and two opposite arcuate side portions of bark respectively contiguous to such upper arcuate portion, comprising, in combination, a support frame, conveyor means on said frame for feeding slabs linearly therethrough and with bark side up; a first cutterhead mounted on said frame in a horizontal attitude above and extending transversely to said conveyor for movement against and away from such upper portion for removing bark therefrom, power-operated means for moving said first cutterhead; a second cutterhead mounted on said frame adjacent said first cutterhead at an acute angle to said conveyor and transversely thereof for movement against and away from one of such side arcuate portions for removing bark therefrom, power-operated means for moving said second cutterhead; a third cutterhead mounted on said frame adjacent said second cutterhead and extending at an acute angle to said conveyor and transversely thereof in an opposite direction to said second cutterhead for movement against and away from the other of such arcuate side portions for removing bark therefrom, and power-operated means for moving said third cutterhead; each of said cutterheads having an endless chain with cutter means thereon and a drive sprocket positionable closely adjacent such slab whereby each chain removes bark from one of such underlying arcuate portions with minimum removal of fibrous wood from such slab and at the same time during debarking permits advancement of such slab on said conveyor means through the frame and under each cutterhead while debarking takes place.

2. In a barking machine for removing bark from slabs, each having an upper arcuate portion of bark and two opposite arcuate side portions of bark respectively contiguous to such upper arcuate portion, the combination with means adapted to feed a slab through the machine with such bark side up, a first means adapted to debark such upper arcuate portion; a second debarking means having an endless chain for removing bark from one of such arcuate side portions, a first motor for applying driving torque to that end of said chain positionable closely adjacent one side of a slab being debarked whereby maximum debarking power of the chain is maintained throughout the debarking of such arcuate side portion, power-operated means for moving said second debarking means against and away from such slab; a third debarking means having an endless chain for removing bark from the other of such arcuate side portions, a second motor for applying driving torque to that end of said last-mentioned chain positionable closely adjacent an opposite side of such slab portion being thereby debarked, whereby maximum debarking power of the chain is maintained throughout the debarking of such other arcuate side portion, and power-operated means for moving said third debarking means against and away from such slab.

3. In a barking machine for removing bark from slabs, each having an upper arcuate portion of bark and two opposite arcuate side portions of bark respectively contiguous to such upper arcuate portion, the combination with means adapted to feed a slab through the machine with such bark side up, a first means adapted to debark such upper arcuate portion; a second debarking means having an endless chain for removing bark from one of such arcuate side portions, a first motor for applying torque to that end of said chain positionable closely adjacent one side of a slab being debarked whereby maximum debarking power of the chain is maintained throughout the debarking of such arcuate side portion, means mounting said second debarking means in said frame for vertical up-and-down movement, power-operated means for so moving said second debarking means; a third debarking means having an endless chain for removing bark from the other of such arcuate side portions, a second motor for applying driving torque to that end of said last-mentioned chain positionable closely adjacent an opposite side of such slab, whereby maximum debarking power of the chain is maintained throughout the debarking of such other arcuate side portion, means mounting said third debarking means for movement downwardly and inwardly into engagement with such other arcuate side portion and for movement upwardly and outwardly from said engagement, and power-operated means for so moving said third debarking means into and out of engagement with such other arcuate side portion.

4. A barking machine for removing bark from slabs, each having an upper arcuate portion of bark and first and second arcuate side portions of bark respectively contiguous to such upper arcuate portion, comprising, in combination, a support frame, conveyor means on said frame for feeding slabs linearly therethrough in a horizontal path and with bark side up, a guide in said frame positioned adjacent said conveyor to guide one edge of a slab being fed; a first cutterhead mounted in said frame for removing bark from such upper arcuate portion and having a first endless cutter chain extending horizontally, a first motor for applying driving torque to that end of said chain positionable closely adjacent one side of such upper arcuate portion, said torque being applied to move said chain over said upper arcuate portion in a direction to urge such slab against said guide, means mounting said first cutterhead in said frame for movement against and away from such upper arcuate portion, power means connected with said first cutterhead for moving the endless chain therein against and away from such upper arcuate portion; a second cutterhead mounted on said frame adjacent said first cutterhead and spaced therefrom in the direction of movement of such slab on said conveyor, said second cutterhead extending at an acute angle to said conveyor and transversely thereof above such first arcuate side portion of bark and adjacent said guide for movement against and away from such first arcuate side portion, said second cutterhead having a second endless cutter chain for removing bark from such first arcuate side portion, a second motor for applying driving torque to that end of said second chain positionable closely adjacent a lowermost edge of such slab being debarked whereby maximum debarking power of the second chain is maintained throughout the debarking of such first arcuate side portion, said torque being applied to the last-mentioned chain in a direction to urge such slab down against said conveyor means, means mounting said second cutterhead in said frame for movement against and away from said first arcuate side portion of bark, power means connected with said second cutterhead for moving the chain therein against and away from such first arcuate side portion of bark; a third cutterhead mounted on said frame adjacent said second cutterhead and spaced therefrom in the direction of movement of a slab on said conveyor, said third cutterhead extending at an acute angle to said conveyor and transversely thereof above such second arcuate side portion of bark for movement against and away from such second arcuate side portion, said third cutterhead having a third endless cutter chain for removing bark from such second arcuate side portion, a third motor for applying driving torque to that end of said third chain positionable closely adjacent on opposite lowermost edge of such slab being debarked whereby maximum debarking power of the third chain is maintained throughout the debarking of such second arcuate side portion, said last-named torque being applied to said third chain in a direction to urge such slab against said guide, means mounting said third cutterhead in said frame for movement against and away from such second arcuate side portion of bark, power means connected with said third cutterhead for moving the chain therein against and away from such second arcuate side portion of bark and power means connected with said third cutterhead for moving the chain therein against and away from such second arcuate side portion of bark.

5. A barking machine of the character described in claim 4 wherein said means mounting said first cutterhead comprises a link adjacent each end of the cutterhead, each of said links being pivoted at its upper end to the frame and at its lower end to the cutterhead, whereby the first cutterhead is held in a horizontal attitude and is swingable against and away from such upper arcuate portion of bark; wherein said second cutterhead-mounting means includes vertical guides in said frame and slide means on the second cutterhead cooperating with said guide means for limiting said second cutterhead to vertical up-and-down movement, and wherein said third cutterhead-mounting means comprises a link adjacent each end of the third cutterhead, each of said last-named links being pivoted at its upper end to the frame and at its lower end to said third cutterhead, whereby said last-named links hold said cutterhead at an acute angle to said conveyor and adjacent such second arcuate side portion of bark for swinging movement against and away from such second arcuate side portion.

6. A barking machine of the character described in claim 5 wherein said frame and conveyor includes a horizontally disposed bedplate, said bedplate having mounted therein horizontally disposed rollers on which slabs move in said horizontal path, cooperating upper and lower feed rollers adjacent said first cutterhead for feeding a slab therebetween and to said cutterheads, upper and lower cooperating feed rollers adjacent the third cutterhead to pull a slab therebetween and past said cutterheads, power-drive means for said feed rollers for driving them selectively in either direction, said bedplate having a transversely extending cutout area below each of said cutterheads and the chains thereof to permit the movement of each of said cutter chains through said bedplate.

7. A barking machine of the character described in claim 5 wherein each of said cutterheads comprises an elongate frame, an idler-sprocket shaft, means mounting said idler-sprocket shaft in one end of said elongate frame for reciprocating movement in the elongate direction of said frame, an idler sprocket mounted on said shaft, a drive shaft mounted on the other end of said frame, a drive sprocket mounted on said drive shaft, said endless cutter chain being mounted on said drive and idler sprockets, biasing means connected with said idler shaft and urging said chain taut but permitting limited yielding movement, said motor being mounted on said frame and adjacent said drive shaft, drive means connecting said motor and said drive shaft, and cutter knives mounted on said endless chain and extending generally transversely thereto.

8. A barking machine for removing bark from arcuate surfaces of slabs comprising, in combination, a support frame, conveyor means on said frame for feeding slabs linearly therethrough and with bark side up, a plurality of cutterheads extending transversely to a path traveled by such slabs and each having at least a first endless chain with cutter knives thereon, means for driving said chains, said cutterheads being positioned adjacent arcuate portions of a slab to remove bark therefrom as such slab is fed past said cutterheads, means mounting said cutterheads for movement against and away from their adjacent bark-covered portions, power means for each cutterhead to move the same against and away from its adjacent bark-covered portion and control means for said conveyor and each of said power means for the cutterheads.

9. A barking machine according to claim 8 wherein arcuate portions of a slab to be debarked define an upper arcuate portion of bark and two opposite arcuate side portions of bark respectively contiguous to such upper arcuate portion, and wherein one of said plurality of cutterheads is a first cutterhead mounted to remove such upper arcuate portion of bark, another is a second cutterhead mounted to remove one of such opposite arcuate side portions of bark and still another of said cutterheads is a third cutterhead mounted to remove another of such opposite arcuate side portions of bark.

10. A barking machine according to claim 9 wherein each of said cutterheads comprises an elongate frame, an idler-sprocket shaft, means mounting said idler-sprocket shaft in one end of said elongate frame for reciprocating movement in the elongate direction of said frame, an idler sprocket mounted on said shaft, a drive shaft mounted on the other end of said frame, a drive sprocket mounted on said drive shaft; wherein at least said first endless chain is mounted on said drive and idler sprockets, biasing means connected between said elongate frame and said idler shaft and holding said chain taut but permitting limited yielding movement; wherein said means for driving said chains comprises a motor mounted on each of said frames and adjacent said drive shaft, and drive means connecting each of said motors and adjacent drive shafts; and wherein said cutter knives are mounted on each of said endless chains so as to extend generally transversely thereto.

11. A barking machine according to claim 10 wherein said first cutterhead-mounting means comprises pivot links positioned adjacent each end of said first cutterhead elongate frame and pivoted about horizontal axes at their upper ends to said support frame and at their lower ends to said first cutterhead elongate frame and supporting said first cutter head elongate frame so that its elongate direction remains horizontal during swinging movement of said first cutterhead toward and away from such upper arcuate portion of bark, and during cutting contact of its endless cutter chain with such bark; wherein said second cutterhead-mounting means comprises vertical guide elements on said support frame and cooperating guides on said second cutterhead elongate frame, said second cutterhead elongate frame being mounted so that its elongate direction remains at an angle of about 20° to a horizontal surface of said conveyor during vertical movement against and away from one of such arcuate side portions of bark; and wherein said third cutterhead-mounting means comprises pivot links positioned adjacent each end of said third cutterhead elongate frame and pivoted about horizontal axes at their upper ends to said support frame and at their lower ends to said third cutterhead elongate frame and supporting said third cutterhead elongate frame so that its elongate direction remains at approximately a 20° angle to the horizontal surface of said conveyor, but at an inclination opposite to that of said second cutterhead elongate frame, and during swinging movement of said third cutterhead against and away from another of such arcuate side portions of bark.

12. A barking machine according to claim 10 wherein each of said drive sprockets comprises a small drive sprocket and a large drive sprocket on said drive shaft, wherein each of said idler sprockets on said idler shaft comprises a small idler sprocket in alignment with the large drive sprocket, and a large idler sprocket in alignment with said small drive sprocket, said small sprockets and said large sprockets being respectively approximately the same size, wherein each cutterhead has a second endless chain, the first endless chain being mounted on said small drive and large idler sprockets, the second endless chain being mounted on said large drive and small idler sprockets whereby said chains in their lower runs between their supporting sprockets form with each other an obtuse angle, in order to accommodate a relatively large arc on a slab to be debarked, and wherein other cutter knives are attached to said second chain so as to extend generally transversely thereto.

13. A barking machine according to claim 10 wherein each of said cutterhead elongate frames comprises a pair of horizontally spaced elongated side bars having depending flange portions at each end for mounting said idler and drive shafts and having an end plate secured to each opposite pair of ends to maintain the horizontal spacing of said side bars.

14. A barking machine according to claim 13 wherein said conveyor means includes idler rollers positioned on said support frame in horizontally spaced relation to convey a slab thereover to a position under said cutterheads and a pair of power-driven feed rollers at each end of said frame, one pair being disposed adjacent said first cutterhead and the other pair being disposed adjacent said third cutterhead, whereby a slab passes successively between said one pair and said other pair as it is conveyed forwardly through the machine.

15. In a slab-barking machine, a cutterhead comprising an elongate frame, a drive shaft mounted in one end of said frame, a small and a large drive sprocket mounted side-by-side on said drive shaft, a motor mounted on said frame adjacent said drive shaft, drive means connecting said motor and said drive shaft, an idler shaft at the other end of said frame, means mounting said idler shaft for reciprocating movement in the elongate direction of said frame, a large and a small idler sprocket mounted on said idler shaft so that the small idler sprocket is in alignment with the large drive sprocket and the large idler sprocket is in alignment with said small drive sprocket, a first chain connecting said small drive sprocket and said large idler sprocket, a second chain connecting said large drive sprocket and said small idler sprocket, said chains forming a relatively large obtuse angle in order to accommodate a relatively large arc on a slab being debarked, biasing means connected between said idler shaft and said elongate frame and holding said chains taut but permitting limited yielding movement, and cutter knives attached to said first and second chains so as to extend generally transversely thereto.

16. In a slab-barking machine according to claim 15 wherein said cutter knives mounted on said first chain have integral depending legs on an infeed side of the first chain, each of said depending legs having a cutting edge thereon for removing bark during forward movement of a slab, and wherein said cutter knives on said second chain have depending legs on an outfeed side of the second chain, each of said last-mentioned depending legs having a cutting edge thereon for removing bark during reverse movement of a slab.

17. In a slab-barking machine, an endless roller chain for a cutterhead, said chain including inner pairs and outer pairs of mutually overlapping lengths, a plurality of U-shaped cutter knives having a bight portion with a cutting edge and leg portions with cutting edges, each of said U-shaped cutter knives spanning and being attached to a pair of said outer links whereby the knives are spaced along said chain.

18. In a slab-barking machine according to claim 17 wherein said cutting edges of the knives are serrated.

19. In a slab-barking machine according to claim 17 wherein cutter bars each having a cutting edge are attached to pairs of said inner links at positions intermediate said U-shaped cutter knives.

20. In a slab-barking machine according to claim 19 wherein said cutting edges on said U-shaped cutter knives and said cutter bars are serrated.

References Cited in the file of this patent

UNITED STATES PATENTS

| | | |
|---|---|---|
| 1,017,655 | Drake | Feb. 20, 1912 |
| 1,759,188 | Davidson | May 20, 1930 |
| 1,818,657 | Talbott et al. | Aug. 11, 1931 |
| 1,937,073 | Stove | Nov. 28, 1933 |
| 2,397,490 | Kenney | Apr. 2, 1946 |
| 2,779,363 | Laughton | Jan. 29, 1957 |
| 2,794,465 | Gyllenberg | June 4, 1957 |

FOREIGN PATENTS

| | | |
|---|---|---|
| 921,833 | Germany | Dec. 30, 1954 |